United States Patent
Huang

(10) Patent No.: US 11,639,130 B1
(45) Date of Patent: May 2, 2023

(54) MOBILE KITCHEN SYSTEM AND VEHICLE

(71) Applicant: William Huang, Nanchang (CN)

(72) Inventor: William Huang, Nanchang (CN)

( * ) Notice: Subject to any disclaimer, the term of this patent is extended or adjusted under 35 U.S.C. 154(b) by 0 days.

(21) Appl. No.: 17/943,188

(22) Filed: Sep. 12, 2022

(30) Foreign Application Priority Data

Aug. 22, 2022 (CN) .................... CN202222211320.4

(51) Int. Cl.
*B60P 3/34* (2006.01)
*B60P 3/36* (2006.01)
*B60R 15/02* (2006.01)

(52) U.S. Cl.
CPC ................... *B60P 3/34* (2013.01); *B60P 3/36* (2013.01); *B60R 15/02* (2013.01)

(58) Field of Classification Search
CPC ... B60R 15/02; B60P 3/36; B60P 3/34; B60N 3/16; B60N 3/102; B60N 3/103; B60N 3/105; B60N 3/106; B60N 3/107; F24C 7/10; F24C 5/20; F24C 3/14; F24C 1/16
USPC ................................................ 296/22, 37.15
See application file for complete search history.

(56) References Cited

U.S. PATENT DOCUMENTS

| | | | | |
|---|---|---|---|---|
| 2,982,578 A * | 5/1961 | Lowe | ................ | B60P 3/0257 296/22 |
| 3,289,664 A * | 12/1966 | Hewitt | ................ | A47B 77/08 312/236 |
| 3,800,939 A * | 4/1974 | Cornelius | ................ | B60N 3/108 220/532 |
| 3,873,010 A * | 3/1975 | Patterson | ................ | B60R 7/043 220/23.88 |
| 4,089,554 A * | 5/1978 | Myers | ................ | B60N 3/16 296/22 |
| 4,518,189 A * | 5/1985 | Belt | ................ | B60N 3/16 248/416 |
| 5,660,310 A * | 8/1997 | LeGrow | ................ | B60R 7/043 62/372 |
| 6,267,111 B1 * | 7/2001 | Burton | ................ | B60P 3/0257 108/65 |
| 10,710,491 B1 * | 7/2020 | Groover | ................ | B60P 3/34 |
| 2008/0179868 A1 * | 7/2008 | Cokeley | ................ | B60P 3/36 280/755 |
| 2014/0069413 A1 * | 3/2014 | Galatte | ................ | F24C 15/08 126/25 R |
| 2014/0366861 A1 * | 12/2014 | Johnson | ................ | B60P 3/36 126/57 |
| 2020/0171996 A1 * | 6/2020 | Chevalier | ................ | B60P 3/34 |
| 2020/0263876 A1 * | 8/2020 | Gross | ................ | A47J 47/16 |
| 2020/0361360 A1 * | 11/2020 | Parker | ................ | B60P 3/36 |
| 2022/0055545 A1 * | 2/2022 | Cooper | ................ | B60P 3/34 |

* cited by examiner

*Primary Examiner* — Gregory A Blankenship

(57) ABSTRACT

The present disclosure provides a mobile kitchen system, mounted in a trunk of a vehicle, the mobile kitchen system includes a box, a first housing received in the box in a drawable manner, and a second housing received in the first housing in a drawable manner, a drawing direction of the second housing is perpendicular to a drawing direction of the first housing. The present disclosure provides a vehicle. The mobile kitchen system of the present disclosure is multifunctional and convenient to use.

18 Claims, 9 Drawing Sheets

MOBILE KITCHEN SYSTEM AND VEHICLE

FIELD

The present disclosure relates to a technical field of vehicles, specifically to a mobile kitchen system and a vehicle.

BACKGROUND

With the improvement of living standards, people often tour by car. In order to cook food while traveling, people usually install a mobile kitchen in a trunk of the car. However, the existing mobile kitchen can only be used for cooking, and does not provide a storing space, which causing the existing mobile kitchen has a single function and is inconvenient to use.

SUMMARY

The present disclosure provides a mobile kitchen system, aiming at solving the problem that the existing mobile kitchen has a single function and is inconvenient to use.

To achieve the above purpose, the present disclosure provides a mobile kitchen system mounted in a trunk of a vehicle, the mobile kitchen system includes a box, a first housing received in the box in a drawable manner, and a second housing received in the first housing in a drawable manner, a drawing direction of the second housing is perpendicular to a drawing direction of the first housing.

In at least one embodiment, the first housing includes a water sink structure and a working platform, and the second housing is arranged opposite to the working platform.

In at least one embodiment, the first housing defines an opening, and the water sink structure is received in the opening.

In at least one embodiment, the mobile kitchen system further includes a third housing, and the third housing is received in the second housing in a drawable manner.

In at least one embodiment, the box includes: a top plate; and two opposite side plates, connected with the top plate to form a receiving space, and the first housing is received in the receiving space in the drawable manner.

In at least one embodiment, the mobile kitchen system further includes: at least one connecting ring, arranged on the box; and at least one protecting belt, one end of the protecting belt is connected with a first side of the trunk, and another end is connected with a second side of the trunk after passing through the connecting ring; or one end of the protecting belt is connected with a first side of the trunk, and another end is connected with the first side of the trunk after passing through the connecting ring.

In at least one embodiment, the top plate defines at least one first clamping groove, and the protecting belt is received in the first clamping groove; and/or the protecting belt includes at least one connecting portion, and the connecting portion is detachably connected with the trunk.

In at least one embodiment, the mobile kitchen system further includes at least one sliding assembly, and the sliding assembly includes: an outer guiding rail, arranged on an inner surface of the box, and the outer guiding rail defines a sliding groove; an inner guiding rail, arranged on an outer surface of the first housing; and a sliding member, slidably received in the sliding groove, and the inner guiding rail is connected with the sliding member.

In at least one embodiment, the mobile kitchen system further includes a locking assembly, the outer guiding rail includes a blocking member and a clamping member, and the locking assembly includes: a handle, rotatably connected with the inner guiding rail and at least partially extended out of the inner guiding rail; a connecting member, one end of the connecting member is connected with the handle; a rotating member, rotatably arranged on the inner guiding rail and defining a second clamping groove, another end of the connecting member is connected with the rotating member, and when the handle is forced to rotate, the handle is configured to drive the rotating member to rotate by the connecting member; and a limiting member, connected with the handle, when the mobile kitchen system is not in use and the first housing is received in the box, the limiting member is limited by the blocking member to prevent the first housing from sliding out of the box automatically; when the handle is forced to rotate, the limiting member is separated from the blocking member, and the sliding member and the inner guiding rail are forced to slide out along the outer guiding rail until the clamping member is clamped in the second clamping member to prevent the first housing from sliding back into the box automatically.

In at least one embodiment, the mobile kitchen system further includes a supporting assembly and a third housing received in the first housing in a drawable manner, the supporting assembly is configured to support the third housing when the mobile kitchen system is in use.

In at least one embodiment, the supporting assembly includes a connecting member and a supporting rod connected with the connecting member; the supporting rod is telescopic; and/or the connecting member is detachably connected with the first housing or the third housing; and/or the connecting member is connected with the first housing or the third housing, and the supporting rod is foldably mounted on the connecting member; and/or the connecting member is connected with the first housing or the third housing, and the supporting rod is detachably connected with the connecting member.

In at least one embodiment, the mobile kitchen system further includes a supporting assembly configured to support the first housing when the mobile kitchen system is in use.

In at least one embodiment, the supporting assembly includes a connecting member and a supporting rod connected with the connecting member; the supporting rod is telescopic; and/or the connecting member is detachably connected with the first housing; and/or the connecting member is connected with the first housing, and the supporting rod is foldably mounted on the connecting member; and/or the connecting member is connected with the first housing, and the supporting rod is detachably connected with the connecting member.

The present disclosure further provides a vehicle, which includes a trunk and the above-mentioned mobile kitchen system.

In at least one embodiment, the first housing includes a water sink structure and a working platform, and the second housing is arranged opposite to the working platform; and/or the mobile kitchen system further includes a third housing, and the third housing is received in the second housing in a drawable manner.

In at least one embodiment, the box includes: a top plate; and two opposite side plates, connected with the top plate to form a receiving space, and the first housing is received in the receiving space in the drawable manner.

In at least one embodiment, the vehicle further includes: at least one connecting ring, arranged on the box; and at least one protecting belt, one end of the protecting belt is connected with a first side of the trunk, and another end is connected with a second side of the trunk after passing through the connecting ring; or one end of the protecting belt is connected with a first side of the trunk, and another end is connected with the first side of the trunk after passing through the connecting ring.

In at least one embodiment, the top plate defines at least one first clamping groove, and the protecting belt is received in the first clamping groove; and/or the protecting belt includes at least one connecting portion, and the connecting portion is detachably connected with the trunk.

In at least one embodiment, the mobile kitchen system further includes at least one sliding assembly, and the sliding assembly includes: an outer guiding rail, arranged on an inner surface of the box, and the outer guiding rail defines a sliding groove; an inner guiding rail, arranged on an outer surface of the first housing; and a sliding member, slidably received in the sliding groove, and the inner guiding rail is connected with the sliding member.

In at least one embodiment, the mobile kitchen system further includes a locking assembly, the outer guiding rail includes a blocking member and a clamping member, and the locking assembly includes: a handle, rotatably connected with the inner guiding rail and at least partially extended out of the inner guiding rail; a connecting member, one end of the connecting member is connected with the handle; a rotating member, rotatably arranged on the inner guiding rail and defining a second clamping groove, another end of the connecting member is connected with the rotating member, and when the handle is forced to rotate, the handle is configured to drive the rotating member to rotate by the connecting member; and a limiting member, connected with the handle, when the mobile kitchen system is not in use and the first housing is received in the box, the limiting member is limited by the blocking member to prevent the first housing from sliding out of the box automatically; when the handle is forced to rotate, the limiting member is separated from the blocking member, and the sliding member and the inner guiding rail are forced to slide out along the outer guiding rail until the clamping member is clamped in the second clamping member to prevent the first housing from sliding back into the box automatically.

In the technical solution of the present disclosure, the mobile kitchen system includes a box, a first housing, and a second housing. The first housing is received in the box in a drawable manner, and the second housing is received in the first housing in a drawable manner. When using the mobile kitchen system, the first housing can be pulled out, and cooking appliances such as a gas stove and a barbecue can be placed on the first housing to cook food. The second housing can be used to store objects, such as chopsticks, spoons, knives, and the like. Therefore, the mobile kitchen system of the present disclosure has multiple functions and is convenient to use. In addition, the drawing direction of the second housing is perpendicular to the drawing direction of the first housing, so that the mobile kitchen system has a compact structure and is convenient for storage.

BRIEF DESCRIPTION OF THE DRAWINGS

Implementations of the present disclosure will now be described, by way of embodiment, with reference to the attached FIGS. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
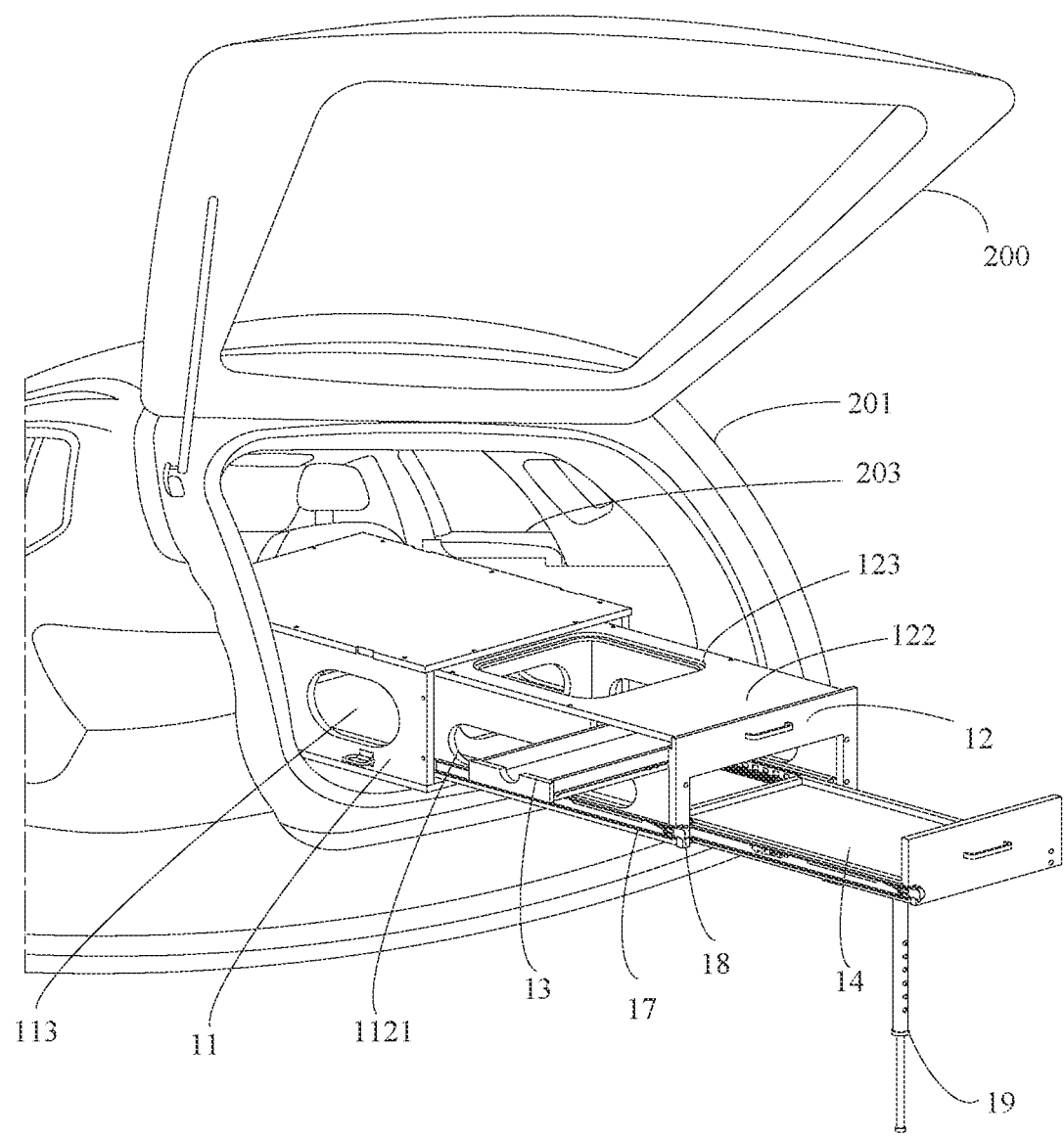
FIG. 1 is a structural diagram of a mobile kitchen system mounted in a trunk of a vehicle according to an embodiment of the present disclosure, and the mobile kitchen system is in a use.

The realization of the aim, functional characteristics, advantages of the present disclosure are further described specifically with reference to the accompanying drawings and embodiments.

DETAILED DESCRIPTION

It will be appreciated that for simplicity and clarity of illustration, where appropriate, reference numerals have been repeated among the different FIGS. to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion in the so-described combination, group, series, and the like. the present disclosure is illustrated by way of example and not by way of limitation in the FIGS. of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second"

may explicitly or implicitly include one or more of the said features. In the description of embodiments of the application, "a plurality of" means two or more, unless otherwise specifically defined.

Figure 2:
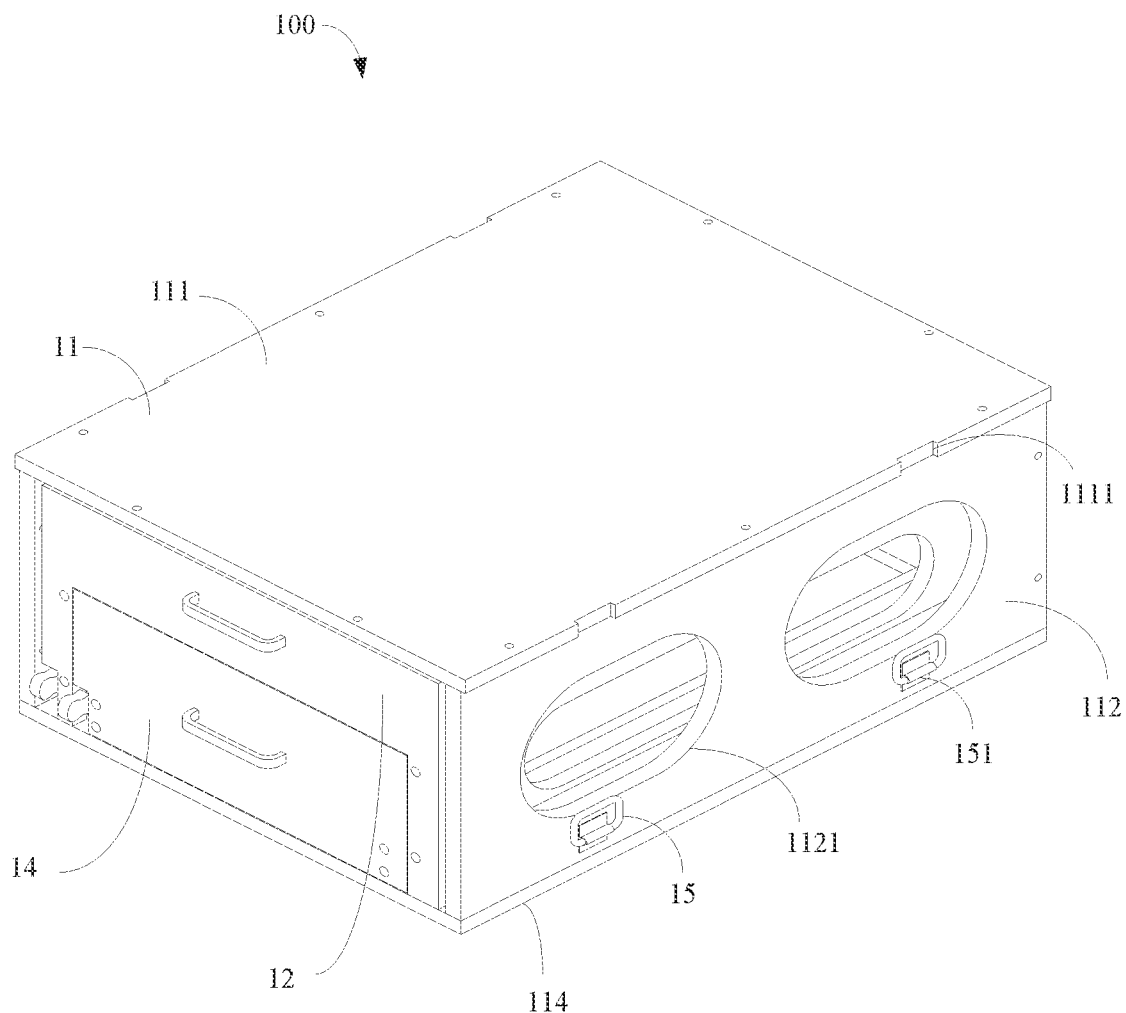
FIG. 2 is a structural diagram of the mobile kitchen system mounted in the trunk of the vehicle according to an embodiment of the present disclosure, and the mobile kitchen system is not in use.
Figure 3:
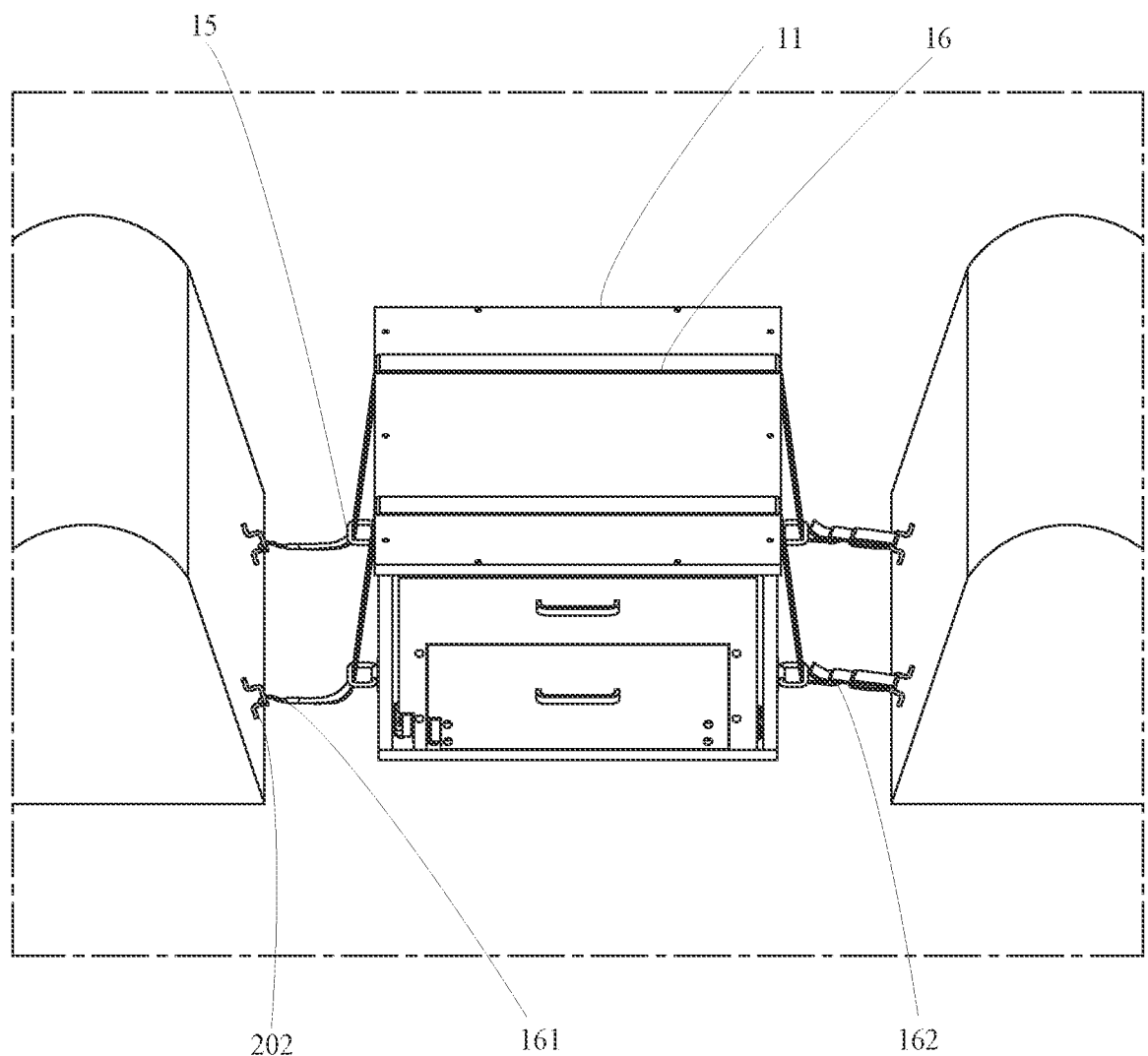
FIG. 3 is a structural diagram of the mobile kitchen system according to an embodiment of the present disclosure.
Figure 4:
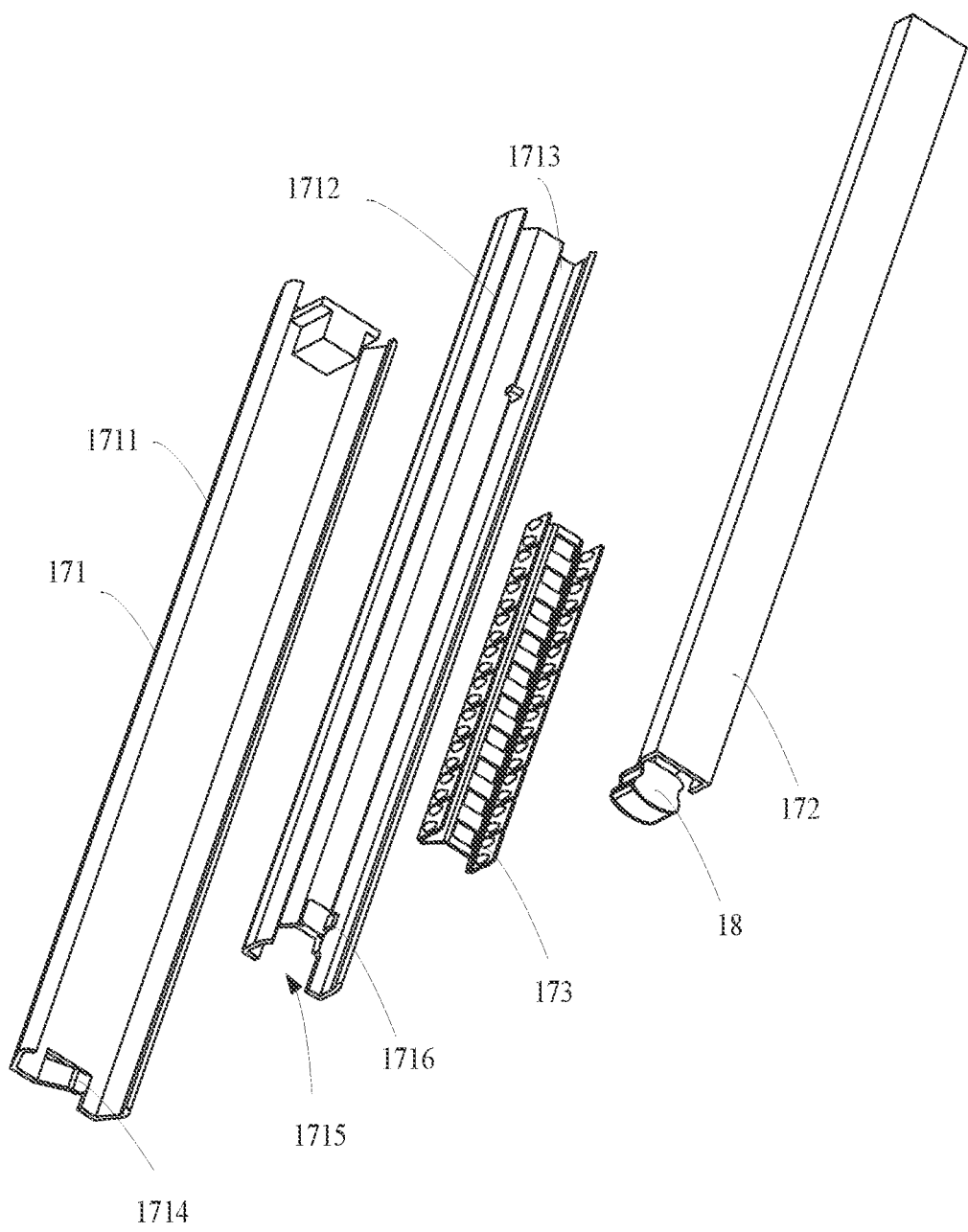
FIG. 4 is an exploded view of a sliding assembly and a locking assembly of the mobile kitchen system according to an embodiment of the present disclosure.
Figure 5:
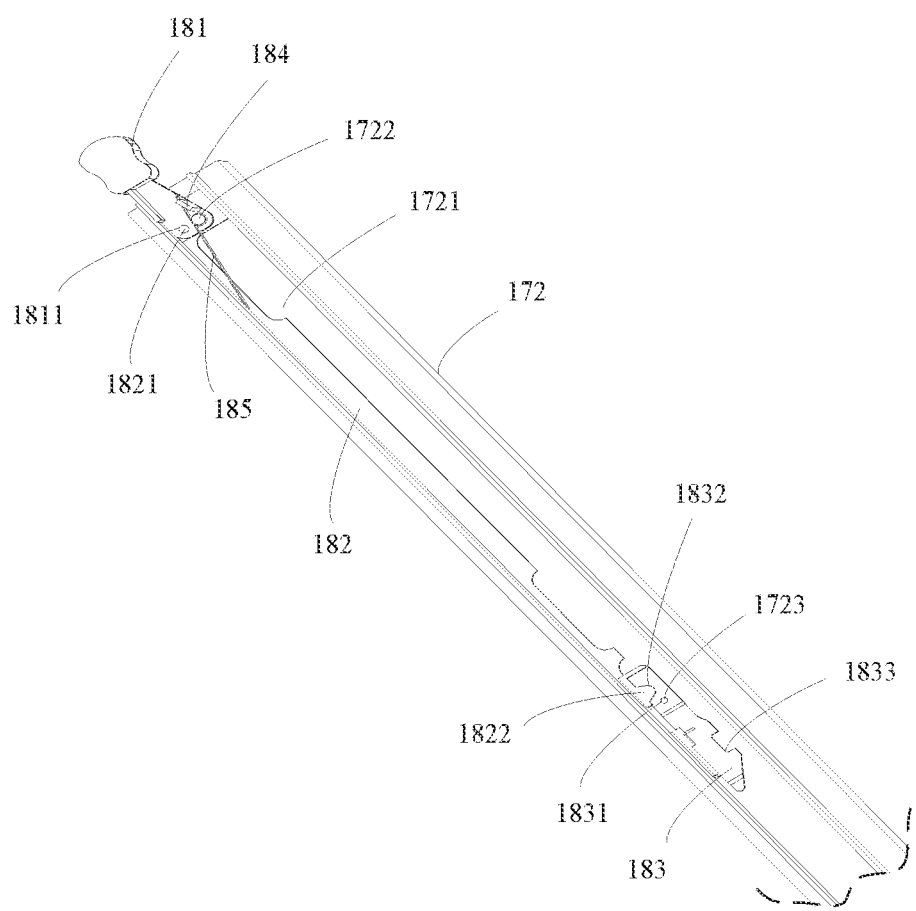
FIG. 5 is a structural diagram of parts of the locking assembly and an inner guiding rail of the mobile kitchen system according to an embodiment of the present disclosure.
Figure 6:
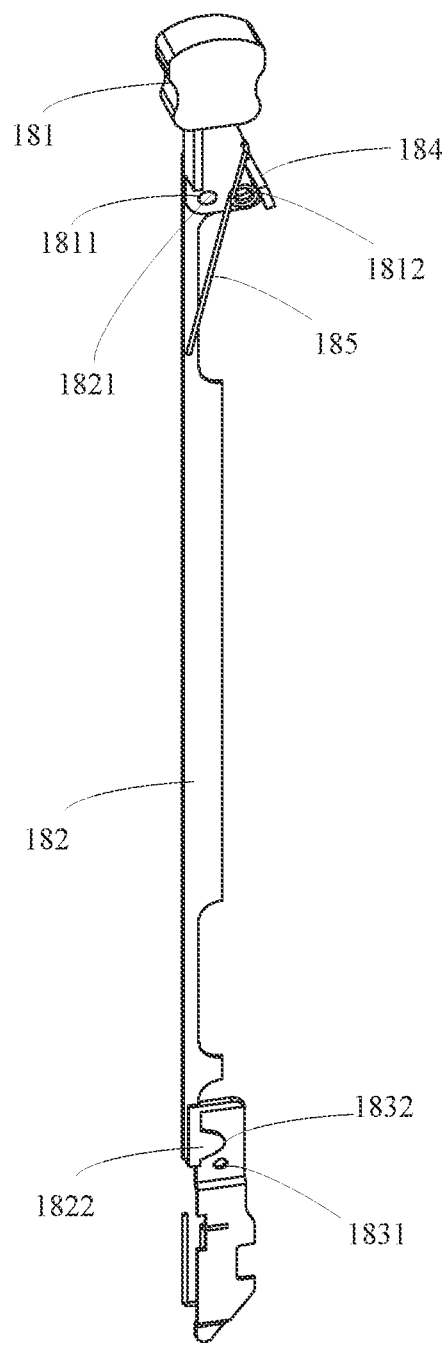
FIG. 6 is a structural diagram of the locking assembly of the mobile kitchen system according to an embodiment of the present disclosure.
Figure 7:
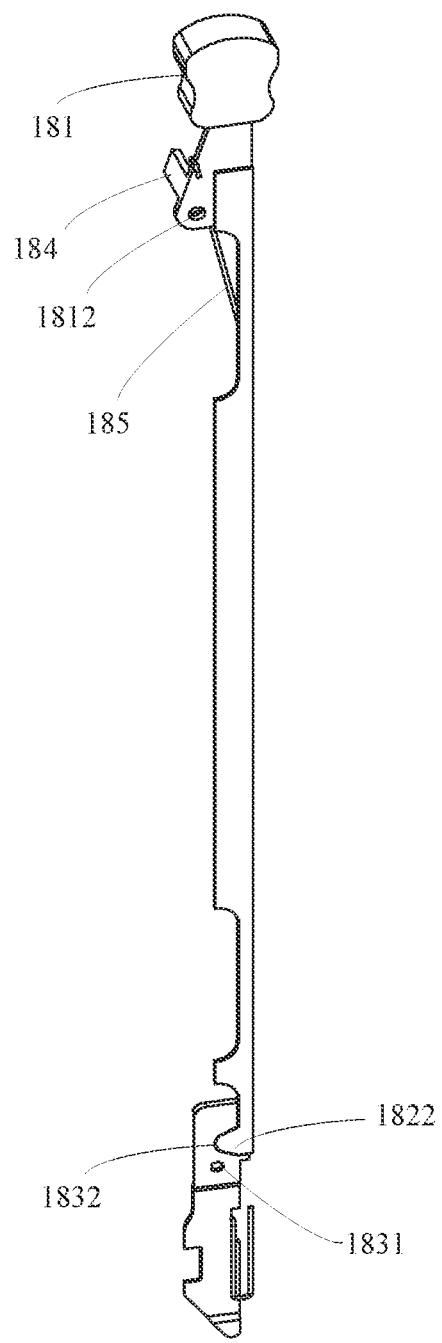
FIG. 7 is similar to FIG. 6, but shown from another view.
Figure 8:
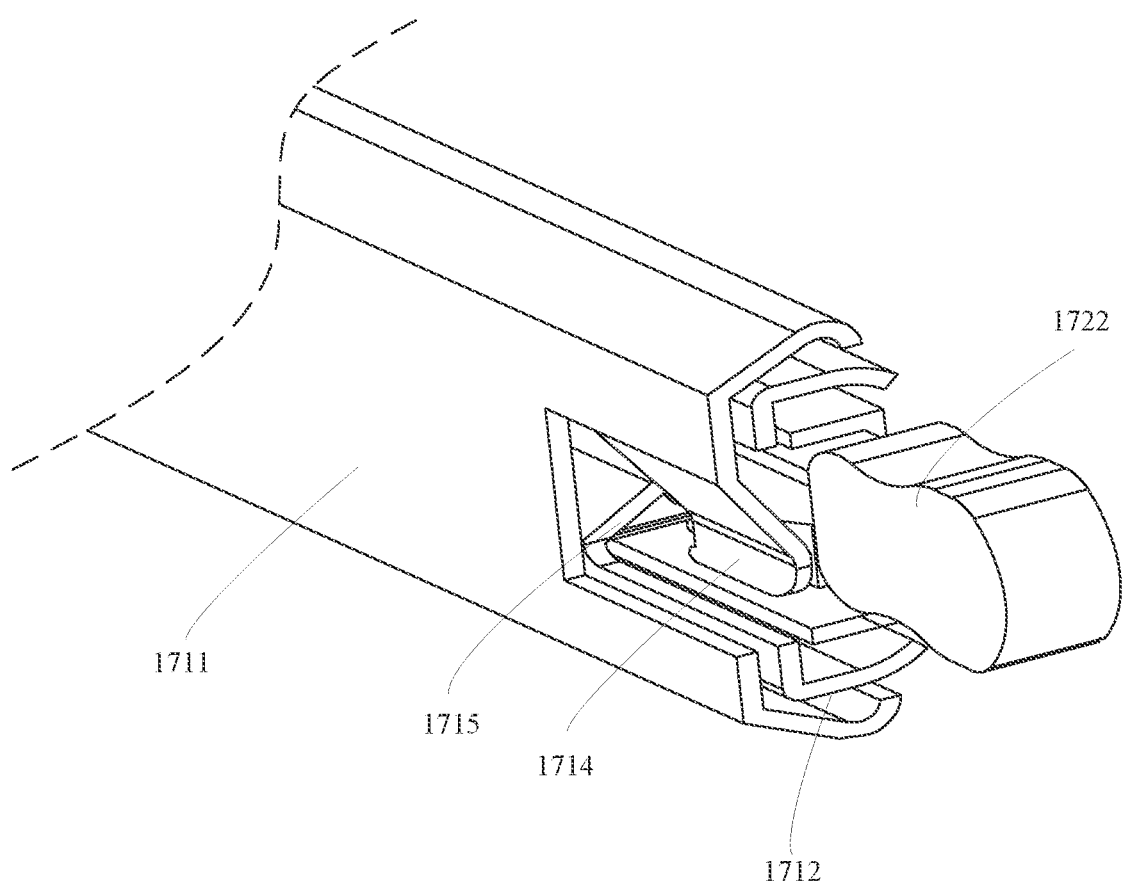
FIG. 8 is a structural diagram of parts of the sliding assembly and the locking assembly of the mobile kitchen system according to an embodiment of the present disclosure.
Figure 9:
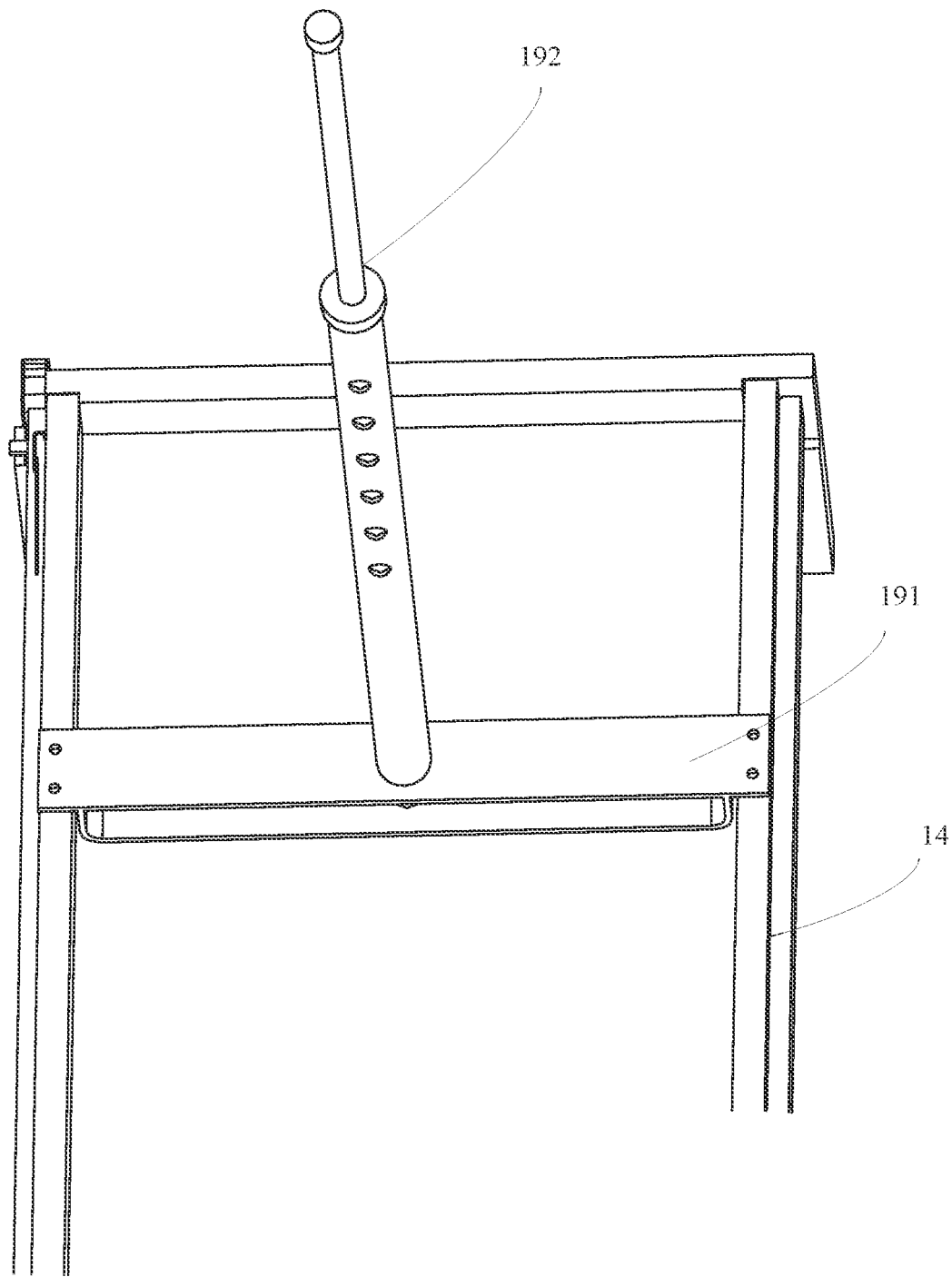
FIG. 9 is a structural diagram of a supporting assembly and a third housing of the mobile kitchen system according to an embodiment of the present disclosure.

Please referring to FIGS. 1 to 9, the present disclosure provides a mobile kitchen system 100 according to an embodiment, the mobile kitchen system 100 can be mounted in a trunk 201 of a vehicle 200.

The mobile kitchen system 100 includes a box 11, a first housing 12 received in the box in a drawable manner 11, and a second housing 13 received in the first housing in a drawable manner 12, and a drawing direction of the second housing 13 is perpendicular to a drawing direction of the first housing 12.

In at least one embodiment, the first housing 12 includes a water sink structure (not labeled) and a working platform 122, and the second housing 13 is arranged opposite to the working platform 122. A water tank (not shown) can be placed on the box 11, and a water outlet of the water tank faces the water sink structure. When water flows out of the water tank, user can use the water sink structure to clean food and other objects.

In at least one embodiment, the first housing 12 defines an opening 123, and the water sink structure is received in the opening 123. In a specific embodiment, the opening 123 is defined in an upper surface 121 of the first housing 12. It can be understood that, areas of the upper surface 121 without the opening 123 can be regarded as the working platform 122. The working platform 122 can be used as a vegetable cutting platform or a storage platform.

In at least one embodiment, the water sink structure can be a telescopic sink.

In the technical solution of the present disclosure, the mobile kitchen system includes a box 11, a first housing 12, and a second housing 13. The first housing 12 is received in the box 11, and the second housing 13 is received in the first housing 12 in a drawable manner. When using the mobile kitchen system 100, the first housing 12 can be pulled out, and cooking appliances (not shown) such as a gas stove and a barbecue can be placed on the first housing 12 to cook food. The second housing 13 can be used to store objects, such as chopsticks, spoons, knives, and the like. Therefore, the mobile kitchen system 100 of the present disclosure has multiple functions and is convenient to use. In addition, the drawing direction of the second housing 13 is perpendicular to the drawing direction of the first housing 12, so that the mobile kitchen system 100 has a compact structure and is convenient for storage.

The mobile kitchen system 100 further includes a third housing 14, and the third housing 14 is received in the second housing 13 in a drawable manner.

The third housing 14 can also be used to place cooking appliances such as gas stove and barbecue oven to cook food.

In the technical solution of the present disclosure, the mobile kitchen system 100 further includes a third housing 14, and the third housing 14 is received in the second housing 13 in a drawable manner. When the third housing 14 is pulled out, the third housing 14 can be used for placing cooking appliances such as gas stove, barbecue oven, etc., so that the mobile kitchen system 100 has multi-functionality.

The box 11 includes a top plate 111 and two opposite side plate 112, the side plates 112 and the top plate 111 are connected with form a receiving space 113, the first housing 12 is received in the receiving space 113 in the drawable manner.

In at least one embodiment, the box 11 further includes a bottom plate 114 connected with the side plates 112. The side plates 112, the top plate 111, and the bottom plate 114 together form the receiving space 113.

In at least one embodiment, the first housing 12 and the side plate 112 both define at least one vent hole 1121. It can be understood that the shape and position of the vent hole 1121 can be set according to actual needs.

In the technical solution of the present disclosure, the box 11 includes a top plate 111 and two opposite side plates 112, the side plates 112 are connected with the top plate 111 to form a receiving space 113, and the first housing 12 is received in the receiving space 113 in the drawable manner, so that the mobile kitchen system 100 has a compact structure.

The mobile kitchen system 100 further includes at least one connecting ring 15 arranged on the box 11, and at least one protecting belt 16. One end of the protecting belt 16 is connected with a first side of the trunk 201, and another end of the protecting belt 16 is connected with a second side of the trunk 201 after passing through the connecting ring 15; or one end of the protecting belt 16 is connected with a first side of the trunk 201, and another end of the protecting belt 16 is connected with the first side of the trunk 201 after passing through the connecting ring 15.

In at least one embodiment, the mobile kitchen system 100 further includes at least one fixing member 151 fixed on the box 11, and the connecting ring 15 is rotatably connected with the fixing member 151.

In at least one embodiment, the fixing member 151 defines an opening (not shown), and the connecting ring 15 is rotatably received in the opening.

In at least one embodiment, the top plate 111 defines at least one first clamping groove 1111, and the protecting belt 16 is received in the first clamping groove 1111 to prevent the protecting belt 16 from shifting.

In at least one embodiment, the protecting belt 16 includes at least one first connecting portion 161, the first connecting portion 161 is detachably connected with the trunk 201. The first connecting portion 161 can be a hook, a hook and loop fastener, or a buckle. The trunk 201 includes a second connecting portion 202 matched with the first connecting portion 161, and the second connecting portion 202 may be a ring-shaped connecting member, a hook and loop fastener, a buckle, or the like.

In at least one embodiment, the trunk 200 includes four second connecting portions 202, and each side of the trunk 21 is provided with two oppositely arranged second connecting portions 202.

In at least one embodiment, the protecting belt 16 further includes at least one length adjusting portion 162, the length adjusting portion 162 is used to adjust a length of the protecting belt 16 to effectively protect the mobile kitchen system 100.

In at least one embodiment, the protecting belt 16 is belt-shaped, so the protecting belt 16 can not only increase a contact area between the protecting belt 16 and the top plate 111 to reduce a risk of the protecting belt 16 moving on the top plate 111, but also can ensure that the top plate 111 and the protecting belt 16 can provide a flat structure for placing the water tank. It should be noted that, in other embodiments, the protecting belt 16 may also be in the shape of a rope.

It can be understood that the mobile kitchen system 100 can also be fixed in the trunk 201 in other ways, such as fixing the mobile kitchen system 100 in the trunk 201 by screws.

In the technical solution of the present disclosure, the mobile kitchen system 100 also includes at least one connecting ring 15 and at least one protecting belt 16. One end of the protecting belt 16 is connected with the first side of the trunk 201, and another end is connected with the second side of the trunk 201 by the connecting ring 15; or one end of the protecting belt 16 is connected with the second side of the trunk 201, and another end is connected with the first side of the trunk 201 after passing through the connecting ring 15, so as to fix the mobile kitchen system 100 in the trunk 201.

The mobile kitchen system 100 further includes at least one sliding assembly 17, and the sliding assembly 17 includes an outer guiding rail 171 arranged on an inner surface of the box 11, an inner guiding rail 172 arranged on an outer surface of the first housing 12, and a sliding member 173 slidably received in the sliding groove 1713. The outer guiding rail 171 defines a sliding groove 1713. The inner guiding rail 172 is connected with the sliding member 1711.

In at least one embodiment, the outer guiding rail 171 includes a first sub guiding rail 1711 arranged on the inner surface of the box 11, and a second sub guiding rail 1712 arranged on the first sub guiding rail 1711, the second sub guiding rail 1712 defines the sliding groove 1713.

In at least one embodiment, the mobile kitchen system 100 includes two oppositely disposed sliding assemblies 17, so that both sides of the first housing 12 can be connected with the box 11 by the sliding assemblies 17.

In at least one embodiment, the first housing 12 and the third housing 14 can also be connected by at least one sliding assembly, the at least one sliding assembly has a similar or the same structure to the sliding assembly 17.

In at least one embodiment, the first housing 12 and the second housing 13 can also be connected by at least one sliding assembly, the at least one sliding assembly has a similar or the same structure to the sliding assembly 17.

In the technical solution of the present disclosure, the mobile kitchen system 100 also includes at least one sliding assembly 17. The sliding assembly 17 includes an outer guiding rail 171 arranged on the inner surface of the box 11, an inner guiding rail 172 arranged on the outer surface of the first housing 12, and a sliding member 173 connected with the inner guiding rail 172. The outer guiding rail 171 defines a sliding groove 1713, and the sliding member 173 is slidably received in the sliding groove 1713 to drive the inner guiding rail 172 to slide along the outer guiding rail 171.

The mobile kitchen system 100 further includes a locking assembly 18, the first sub guiding rail 1711 is protruded with a blocking member 1714, and the second sub guiding rail 1712 defines a notch 1715 for accommodating the blocking member 1714, the second sub guiding rail 1712 is also protruded with a clamping member 1716, the inner guiding rail 172 defines a receiving groove 1721. The locking assembly 18 includes a handle 181 rotatably received in the receiving groove 1721 and at least partially extended out of the inner guiding rail 1721, a connecting member 182, a rotating member 183 rotatably received in the receiving groove 1721 and defining a second clamping groove 1833, and a limiting member 184 connected with the handle 181. One end of the connecting member 182 is connected with the handle 181, another end of the connecting member 182 is connected with the rotating member 183. When the handle 181 is forced to rotate, the handle 181 is configured to drive the rotating member 183 to rotate by the connecting member 182. When the mobile kitchen system 100 is not in use and the first housing 12 is received in the box 11, the limiting member 184 is limited by the blocking member 1714 to prevent the first housing 12 from sliding out of the box 11 automatically; when the handle 181 is forced to rotate, the limiting member 184 is separated from the blocking member 1714, and the sliding member 173 and the inner guiding rail 172 are forced to slide out along the outer guiding rail 171 until the clamping member 1716 is clamped in the second clamping groove 1833 to prevent the first housing 12 from sliding back into the box 11 automatically.

In at least one embodiment, the handle 181 defines a first through hole 1811, the connecting member 182 is protruded with a first protrusion 1821, and the first protrusion 1821 is received in the first through hole 1811. When the handle 181 is forced to rotate, the connecting member 182 can be driven to move in a direction away from the rotating member 183, thereby driving the rotating member 183 to rotate.

In at least one embodiment, the inner guiding rail 172 is protruded with a second protrusion 1722, the handle 181 defines a second through hole 1812, and the second protrusion 1722 is received in the second through hole 1812, so that the handle 181 is rotatably sleeved on the second protrusion 1722. The second protrusion 1722 is protruded from an inner wall of the receiving groove 1721.

In at least one embodiment, the inner guiding rail 172 is further protruded with a third protrusion 1723, the rotating member 183 defines a third through hole 1831, and the third protrusion 1723 is received in the third through hole 1831, and the rotating member 183 is rotatably sleeved on the third protrusion 1723. When the handle 181 is forced to rotate, the handle 181 drives the connecting member 182 to move, so that the connecting member 182 can drive the rotating member 183 to rotate.

In at least one embodiment, the mobile kitchen system 100 further includes an engaging portion 1822 protruded from one end of the connecting member 182 away from the handle 181, the rotating member 183 defines a groove 1832, and the engaging portion 1822 is received in the groove 1832, when the handle 181 is forced to rotate, the connecting member 182 moves, since the connecting member 182 is engaged with the rotating member 183, the connecting member 182 can drive the rotating member 183 to rotate around the rotating member 183.

In at least one embodiment, the limiting member 184 is arranged on the handle 181.

In at least one embodiment, the limiting member 184 is received in the receiving groove 1721.

In at least one embodiment, the second clamping groove 1833 is defined in an end of the rotating member 183 away from the handle 181.

In at least one embodiment, the locking assembly 18 further includes an elastic member 185, one end of the elastic member 185 is connected with the handle 181, and another end of the elastic member 185 is connected with the connecting member 182. When the handle 181 is forced to rotate, the elastic member 185 is in a stretched state, and the elastic member 185 can pull the connecting member 182 to move. When the first housing 12 is pushed back into the box 11, the clamping member 1716 is separated from the second clamping groove 1833, and the elastic member 185 can drive the first housing 12 to automatically slide back into the box 11.

In at least one embodiment, the mobile kitchen system 100 further includes another locking structure having the same or similar structure as the locking assembly 18. The another locking structure can be arranged on the sliding assembly between the first housing 12 and the third housing 14.

In at least one embodiment, the mobile kitchen system 100 further includes a further locking structure having the same or similar structure as the locking assembly 18. The further locking structure can be arranged on the sliding assembly between the first housing 12 and the second housing 13.

In the technical solution of the present disclosure, the locking assembly 18 includes a handle 181, a connecting member 182, a rotating member 183, and a limiting member 184 connected with the handle 181. The handle 181 is received in the receiving groove 1721 and partially extends out of the receiving groove 1721, and the rotating member 183 is rotatably disposed in the receiving groove 1721. One end of the connecting member 182 is connected with the handle 181, and another end of the connecting member 182 is connected with the rotating member 183. When the handle 181 is forced to rotate, the handle 181 can drive the rotating member 183 to rotate by the connecting member 182. When the mobile kitchen system 100 is not in use and the first housing 12 is received in the box 11, the limiting member 184 is stopped by the blocking member 1714 to prevent the first housing 12 from automatically sliding out of the box 11; when the handle 181 is forced to rotate, the limiting member 184 is separated from the blocking member 1714, so that the sliding member 173 and the inner guiding rail 172 can slide out along the outer guiding rail 171, until the clamping member 1716 is clamped in the second clamping groove 1833, to prevent the first housing 12 from sliding back into the box 11 automatically.

The mobile kitchen system 100 further includes a supporting assembly 19, the supporting assembly 29 is used to support the first housing 12 or the third housing 14 when the mobile kitchen system 100 is in use.

In at least one embodiment, the supporting assembly 19 includes a connecting member 191 and a supporting rod 192 connected with the connecting member 191.

In at least one embodiment, the supporting rod 192 is telescopic.

In at least one embodiment, the connecting member 191 is detachably connected with the first housing 12 or the third housing 14.

In at least one embodiment, the connecting member 191 is connected with the first housing 12 or the third housing 14, and the supporting rod 192 is foldably mounted on the connecting member 191.

In at least one embodiment, the connecting member 191 is connected with the first housing 12 or the third housing 14, and the supporting rod 192 is detachably connected with the connecting member 191.

In the technical solution of the present disclosure, the mobile kitchen system 100 further includes a supporting assembly 19, and the supporting assembly 19 is used to support the first housing 12 or the third housing 14 when the mobile kitchen system 100 is in use, to increase the stability of the mobile kitchen system 100.

The present disclosure further provides a vehicle 200, the vehicle 200 includes a vehicle body 203, a trunk 201 arranged in the vehicle body 203, and the mobile kitchen system 100. The vehicle 200 also includes vehicle wheels, steering wheel, brake system, and other essential components.

As the vehicle 200 adopts all the technical proposals of the above exemplary embodiments, the vehicle 200 at least has all of the beneficial effects of the technical proposals of the above exemplary embodiments, no need to repeat again.

The above description is merely some embodiments. It should be noted that for one with ordinary skills in the art, improvements can be made without departing from the concept of the present disclosure, but these improvements shall fall into the protection scope of the present disclosure.

What is claimed is:

1. A mobile kitchen system, mounted in a trunk of a vehicle, wherein the mobile kitchen system comprises:
    a box;
    a first housing, received in the box in a drawable manner; and
    a second housing, received in the first housing in a drawable manner, and a drawing direction of the second housing is perpendicular to a drawing direction of the first housing;
    at least one sliding assembly, comprising:
        an outer guiding rail, arranged on an inner surface of the box, the outer guiding rail comprises a blocking member and a clamping member; and
        an inner guiding rail, arranged on an outer surface of the first housing and slidably connected with the outer guiding rail; and
    a locking assembly, comprising:
        a handle, rotatably connected with the inner guiding rail and at least partially extended out of the inner guiding rail;
        a connecting member, one end of the connecting member is connected with the handle;
        a rotating member, rotatably arranged on the inner guiding rail and defining a second clamping groove, another end of the connecting member is connected with the rotating member, and when the handle is forced to rotate, the handle is configured to drive the rotating member to rotate by the connecting member; and
        a limiting member, connected with the handle, when the mobile kitchen system is not in use and the first housing is received in the box, the limiting member is limited by the blocking member to prevent the first housing from sliding out of the box automatically; when the handle is forced to rotate, the limiting member is separated from the blocking member, and the sliding member and the inner guiding rail are forced to slide out along the outer guiding rail until the clamping member is clamped in the second clamping member to prevent the first housing from sliding back into the box automatically.

2. The mobile kitchen system according to claim 1, wherein
    the first housing comprises a water sink structure and a working platform, and the second housing is arranged opposite to the working platform.

3. The mobile kitchen system according to claim 2, wherein the first housing defines an opening, and the water sink structure is received in the opening.

4. The mobile kitchen system according to claim 1, wherein the mobile kitchen system further comprises a third housing, and the third housing is received in the first housing in a drawable manner.

5. The mobile kitchen system according to claim 1, wherein the box comprises:
    a top plate; and
    two opposite side plates, connected with the top plate to form a receiving space, and the first housing is received in the receiving space in the drawable manner.

6. The mobile kitchen system according to claim 5, further comprising:
   at least one connecting ring, arranged on the box; and
   at least one protecting belt, one end of the protecting belt is connected with a first side of the trunk, and another end is connected with a second side of the trunk after passing through the connecting ring; or one end of the protecting belt is connected with a first side of the trunk, and another end is connected with the first side of the trunk after passing through the connecting ring.

7. The mobile kitchen system according to claim 6, wherein the top plate defines at least one first clamping groove, and the protecting belt is received in the first clamping groove; and/or
   the protecting belt comprises at least one connecting portion, and the connecting portion is detachably connected with the trunk.

8. The mobile kitchen system according to claim 1, wherein the outer guiding rail defines a sliding groove, and the sliding assembly further comprises:
   a sliding member, slidably received in the sliding groove, and the inner guiding rail is connected with the sliding member.

9. The mobile kitchen system according to claim 1, wherein the mobile kitchen system further comprises a supporting assembly and a third housing received in the first housing in a drawable manner, the supporting assembly is configured to support the third housing when the mobile kitchen system is in use.

10. The mobile kitchen system according to claim 9, wherein the supporting assembly comprises a connecting member and a supporting rod connected with the connecting member; wherein,
   the supporting rod is telescopic; and/or
   the connecting member is detachably connected with the first housing or the third housing; and/or
   the connecting member is connected with the first housing or the third housing, and the supporting rod is foldably mounted on the connecting member; and/or
   the connecting member is connected with the first housing or the third housing, and the supporting rod is detachably connected with the connecting member.

11. The mobile kitchen system according to claim 1, wherein the mobile kitchen system further comprises a supporting assembly configured to support the first housing when the mobile kitchen system is in use.

12. The mobile kitchen system according to claim 11, wherein the supporting assembly comprises a connecting member and a supporting rod connected with the connecting member; wherein,
   the supporting rod is telescopic; and/or
   the connecting member is detachably connected with the first housing; and/or
   the connecting member is connected with the first housing, and the supporting rod is foldably mounted on the connecting member; and/or
   the connecting member is connected with the first housing, and the supporting rod is detachably connected with the connecting member.

13. A vehicle, comprising a vehicle body, a trunk arranged in the vehicle body, and a mobile kitchen system as recited in claim 1.

14. The vehicle according to claim 13, wherein the first housing includes a water sink structure and a working platform, and the second housing is arranged opposite to the working platform; and/or the mobile kitchen system further comprises a third housing, and the third housing is received in the first housing in a drawable manner.

15. The vehicle according to claim 13, wherein the box comprises:
   a top plate; and
   two opposite side plates, connected with the top plate to form a receiving space, and the first housing is received in the receiving space in the drawable manner.

16. The vehicle according to claim 15, further comprising:
   at least one connecting ring, arranged on the box; and
   at least one protecting belt, one end of the protecting belt is connected with a first side of the trunk, and another end is connected with a second side of the trunk after passing through the connecting ring; or one end of the protecting belt is connected with a first side of the trunk, and another end is connected with the first side of the trunk after passing through the connecting ring.

17. The vehicle according to claim 16, wherein the top plate defines at least one first clamping groove, and the protecting belt is received in the first clamping groove; and/or
   the protecting belt comprises at least one connecting portion, and the connecting portion is detachably connected with the trunk.

18. The vehicle according to claim 13, wherein the outer guiding rail defines a sliding groove, and the sliding assembly further comprises:
   a sliding member, slidably received in the sliding groove, and the inner guiding rail is connected with the sliding member.

\* \* \* \* \*